US011079009B2

(12) United States Patent
Bruch et al.

(10) Patent No.: US 11,079,009 B2
(45) Date of Patent: Aug. 3, 2021

(54) SHIFT SIGNAL TRANSMITTER FOR A MANUAL TRANSMISSION OF A VEHICLE AND SHIFT APPARATUS FOR A MANUAL TRANSMISSION

(71) Applicant: BING POWER SYSTEMS GMBH, Nuremberg (DE)

(72) Inventors: Romina Bruch, Fuerth (DE); Martin Zangl, Hoechstadt (DE)

(73) Assignee: BING Power Systems GmbH, Nuremberg (DE)

( * ) Notice: Subject to any disclaimer, the term of this patent is extended or adjusted under 35 U.S.C. 154(b) by 0 days.

(21) Appl. No.: 16/774,373

(22) Filed: Jan. 28, 2020

(65) Prior Publication Data

US 2020/0158230 A1 May 21, 2020

Related U.S. Application Data

(63) Continuation of application No. PCT/EP2018/069306, filed on Jul. 16, 2017.

(30) Foreign Application Priority Data

Jul. 28, 2017 (DE) .............................. 102017213041

(51) Int. Cl.
*F16H 59/10* (2006.01)
*F16H 61/28* (2006.01)
*F16H 61/24* (2006.01)

(52) U.S. Cl.
CPC ....... *F16H 59/105* (2013.01); *F16H 61/2807* (2013.01); *F16H 2061/242* (2013.01)

(58) Field of Classification Search
CPC ............... F16H 59/105; F16H 61/2807; F16H 2061/242
See application file for complete search history.

(56) References Cited

U.S. PATENT DOCUMENTS

| 5,949,344 A | * | 9/1999 | Yasuda | ................. F16H 59/105 340/686.3 |
| 6,021,368 A | * | 2/2000 | Taniguchi | ............. F16H 59/105 318/159 |

(Continued)

FOREIGN PATENT DOCUMENTS

| DE | 102010015037 A1 | 10/2011 |
| DE | 102012111908 A1 | 6/2014 |

(Continued)

*Primary Examiner* — David M Fenstermacher
(74) *Attorney, Agent, or Firm* — Laurence A. Greenberg; Werner H. Stemer; Ralph E. Locher

(57) ABSTRACT

A shift signal transmitter for a manual transmission of a vehicle, in particular of a motorcycle, includes a shift rod for force-transmitting coupling to a foot lever, optionally with the interposition of an extension rod. The shift rod is guided along its longitudinal axis in an axially displaceable manner between two axial stops in an, in particular sleeve-shaped, housing. A connecting piece, which serves for coupling to a shift lever, is rigidly connected to the housing opposite to an internal axial end of the shift rod. A distance sensor for contact-free distance measurement is disposed within the housing opposite to the internal axial end of the shift rod and a sensor area of the distance sensor is oriented radially relative to the longitudinal axis. A shift apparatus for a manual transmission of a vehicle is also provided.

11 Claims, 3 Drawing Sheets

(56) References Cited

U.S. PATENT DOCUMENTS

| | | | |
|---|---|---|---|
| 6,550,351 B1* | 4/2003 | O'Reilly | F16H 59/105 |
| | | | 74/335 |
| 2008/0142346 A1* | 6/2008 | Zapf | H03K 17/9525 |
| | | | 200/61.88 |
| 2010/0207614 A1* | 8/2010 | Kammer | F16H 59/044 |
| | | | 324/207.25 |
| 2012/0000309 A1* | 1/2012 | Takagi | G01D 11/24 |
| | | | 74/473.1 |
| 2013/0110364 A1* | 5/2013 | Yamada | F16H 59/105 |
| | | | 701/61 |
| 2017/0299054 A1* | 10/2017 | Kurita | F16H 61/32 |
| 2018/0003299 A1* | 1/2018 | Ebina | F16H 63/30 |
| 2018/0180170 A1* | 6/2018 | Kvarnstrom | F16H 59/044 |
| 2019/0145510 A1* | 5/2019 | Moreno Colom | F16H 59/0217 |
| | | | 74/473.3 |
| 2020/0096307 A1* | 3/2020 | Fukumoto | G05G 1/015 |
| 2020/0158230 A1* | 5/2020 | Bruch | B62M 25/08 |
| 2020/0309252 A1* | 10/2020 | Jiran | F16H 59/0204 |

FOREIGN PATENT DOCUMENTS

| | | | |
|---|---|---|---|
| JP | 2016061339 A | 4/2016 | |
| WO | 0003912 A2 | 1/2000 | |

* cited by examiner

SHIFT SIGNAL TRANSMITTER FOR A MANUAL TRANSMISSION OF A VEHICLE AND SHIFT APPARATUS FOR A MANUAL TRANSMISSION

CROSS-REFERENCE TO RELATED APPLICATION

This is a continuation application, under 35 U.S.C. § 120, of copending International Application PCT/EP2018/069306, filed Jul. 16, 2018, which designated the United States; this application also claims the priority, under 35 U.S.C. § 119, of German Patent Application DE 10 2017 213 041, filed Jul. 28, 2017; the prior applications are herewith incorporated by reference in their entirety.

BACKGROUND OF THE INVENTION

Field of the Invention

In vehicles with a manual transmission, in particular motorcycles, electric signaling devices are used to indicate a request for a gear change by a vehicle user to a vehicle control unit, in particular an engine control unit, in particular in order to be able to avoid the use of the clutch in a simple manner while driving. The vehicle control unit is set up to adjust the engine speed to the gearbox speed according to the corresponding (shift) signal, so that the next higher or next lower gear can be engaged with comparatively little effort even in the coupled state (i.e. when the clutch is engaged). That has the advantage that, in particular in the case of motorcycles, the effort for actuating (in particular for disengaging) the clutch as well as for engaging the respective gear can be reduced. That can increase driving comfort.

Frequently, the transmitter used to generate the shift signal is introduced into the force transmission path of the shift linkage. In other words, in the case of a motorcycle, it is introduced between the foot shift lever and the shift lever on the gearbox side. For example, the shift rod is separated in the power transmission direction so that a short idle stroke is formed in comparison to the entire shift distance, which can be used to generate the shift signal when actuating the shift rod for triggering at least one switching element, for example a button or the like. It is recognized that mechanical switches are particularly subject to wear and environmental influences such as temperature due to contact with the triggering element. Furthermore, a separate switch is usually required for each switching direction.

SUMMARY OF THE INVENTION

It is accordingly an object of the invention to provide a shift signal transmitter for a manual transmission of a vehicle and a shift apparatus for a manual transmission, which improve and overcome the hereinafore-mentioned disadvantages of the heretofore-known transmitters and apparatuses of this general type.

With the foregoing and other objects in view there is provided, in accordance with the invention, a shift signal transmitter for a manual transmission of a vehicle, in particular a motorcycle. The shift signal transmitter includes a shift rod for force transmission coupling to a foot lever, optionally by interconnecting an extension rod. In addition, the shift signal transmitter includes an, in particular sleeve-like, housing in which the shift rod is axially movable along its longitudinal axis between two axial stops. Furthermore, the shift signal transmitter includes a connecting piece for coupling to a shift lever, which is rigidly connected to the housing opposite to an internal, i.e. disposed inside the housing, axial end of the shift rod. Furthermore, the shift signal transmitter includes a distance sensor for contactless distance measurement, wherein the distance sensor is disposed within the housing opposite to the internal axial end of the shift rod and is oriented with a sensor surface radially to the longitudinal axis. In addition, the distance sensor has a circuit board, which is oriented within the housing opposite to the internal axial end of the shift rod and with its surface extension radially to the longitudinal axis of the shift rod. The circuit board thus spans the sensor surface. For this purpose, the circuit board carries an electrically conductive conductor track, through which an inductive measuring field is generated, preferably during normal operation, with field lines preferably running parallel to the longitudinal axis of the shift rod at least in a predetermined measuring range of the distance sensor in sections. In addition, the circuit board carries an evaluation circuit for generating a shift signal.

With the objects of the invention in view, there is also provided a shift apparatus for a manual transmission of a vehicle, including a shift signal transmitter according to the invention.

Preferably, the evaluation unit is used to measure the distance from the internal axial end of the shift rod. Preferably, the evaluation circuit is set up to generate the shift signal based on the distance measurement, i.e. depending on the detected distance of the internal axial end from the coil. The distance sensor is therefore formed as an integral component for measuring and evaluating the distance to the internal axial end and preferably for outputting the shift signal.

Preferably, the shift signal generated by the shift signal transmitter, specifically by the evaluation circuit, during the intended operation is transmitted to a higher-level controller, for example the engine control unit of the vehicle, in particular of the motorcycle. This uses the shift signal (in particular directly or indirectly) to match an (engine) speed and a gearbox speed to each other. The smaller the speed difference, the smaller the shifting force required for a gear change, especially when the clutch is engaged. The inductive measurement is advantageously equally insusceptible to otherwise mainly disturbing influences such as impurities, liquids and the like. Similarly, mechanical influences, for example abrasion and the like, are advantageously avoided due to the contactless measurement.

In a preferred embodiment, the circuit board carries a particularly spirally formed coil as an electrically conductive conductor path, which is preferably printed on the circuit board and which is used for generation of the inductive measuring field and thus for the inductive distance measurement from the internal axial end of the shift rod.

Furthermore, the evaluation circuit in a preferred embodiment is set up to output a first shift signal when the internal axial end of the shift rod approaches closer than a first switching value to the coil and to output a second shift signal when the axial end is further away from the coil than a second switching value. In other words, the evaluation circuit of the distance sensor is set up to output the first shift signal when the internal axial end approaches to within a predetermined first distance value (to which the corresponding first switching value is assigned) and to output the second shift signal if the internal axial end is moved away from the coil by more than a predetermined second distance value (to which the corresponding second switching value is assigned). As a result, it is easy to generate a shift signal associated with a gear change to a higher or lower gear with only one sensor. Optionally, a measurement value curve, usually a voltage value curve against time, is considered for the generation of the respective shift signal and is compared with the corresponding switching or limit values. The detected (output) voltage of the conductor track, in particular the coil, represents a characteristic measure of the distance of the axial end of the shift rod from the coil. In this case, the evaluation circuit therefore also serves in particular to check the distance measurement for the fulfillment of evaluation criteria, i.e. to recognize exceeding the respective given switching values and to output the respective first or second shift signal only in the correct case. In this variant, the higher-level controller can use the respective shift signal directly for controlling the engine and/or the manual transmission.

In an alternative embodiment, the evaluation circuit is in particular set up for amplifying the output voltage of the conductor track, in particular the coil, and for passing on the measuring voltage resulting from this output voltage as the shift signal to the higher-level controller, for example the engine control unit of the vehicle, in particular the motorcycle. In this case, therefore, the engine control unit itself preferably evaluates the received shift signal, therefore the measuring voltage (or a measurement value curve resulting from the variation with time of the values of the measuring voltage) and triggers the adjustment of the (engine) speed accordingly.

Preferably, the first and second switching values are selected in such a way that they are separated by a shift signal-free distance value. This makes it possible that an unintentional generation, and thus the incorrect output, of the respective shift signal is prevented in the event of slight displacements of the shift rod starting from a neutral position. This neutral position is conveniently located between two corresponding switching positions assigned to the two switching values, i.e. in particular between the distances from the distance sensor assigned to the two switching values.

In a practical embodiment, the circuit board and thus also the conductor track, in particular the coil, are immovably attached to the housing in the interior of the housing. Therefore, the printed circuit board is fixed relative to the shift rod.

The shift rod is further preferably movable from the neutral position (i.e. the neutral setting) by a first shift stroke towards the distance sensor and by a second shift stroke away from the distance sensor. Preferably, the shift rod is clamped in the neutral position by a spring—in the unloaded state, i.e. without an external force action by a driver of the vehicle.

The two axial stops are used, in particular during a movement of the shift rod, which takes place in particular beyond the respective shift stroke, as a driver for transmitting a shift force applied to the shift rod in the respective axial direction. Such a movement of the shift rod, which exceeds the respective shift stroke, is required in order to transfer the required shift distance to the manual transmission.

The respective shift stroke preferably represents only a fraction of the total shift distance, for example 5 to 50 percent. In particular, however, this fraction depends on the respective manual transmission. As a result, it is advantageously possible that when actuating the foot lever, the respective shift stroke is first overcome or alternatively, due to the output of the measuring voltage as a shift signal, the higher-level controller of the vehicle generates an internal shift signal and then the higher-level controller triggers the alignment of the engine speed and the gearbox speed. Subsequently, i.e. with further movement of the foot lever, the shift distance to the gear change is overcome, wherein the required shift force decreases due to the alignment of the speeds, so that shifting is simplified without actuating the clutch.

Preferably, the shift rod and/or a sleeve for example attached to the internal axial end for the support thereof are formed from a non-magnetic material. The use of the coil and thus the distance measurement according to the inductive measuring principle namely allows the sensing (detecting) of non-magnetic objects, so that advantageously the use of a usually comparatively expensive magnetic material can be omitted.

Alternatively, the shift rod and/or the sleeve are made of magnetic material.

The conjunction "and/or" is to be understood in this case and below in particular in such a way that the characteristics linked by this conjunction may be formed both jointly and as alternatives to each other.

Other features which are considered as characteristic for the invention are set forth in the appended claims.

Although the invention is illustrated and described herein as embodied in a shift signal transmitter for a manual transmission of a vehicle and a shift apparatus for a manual transmission, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
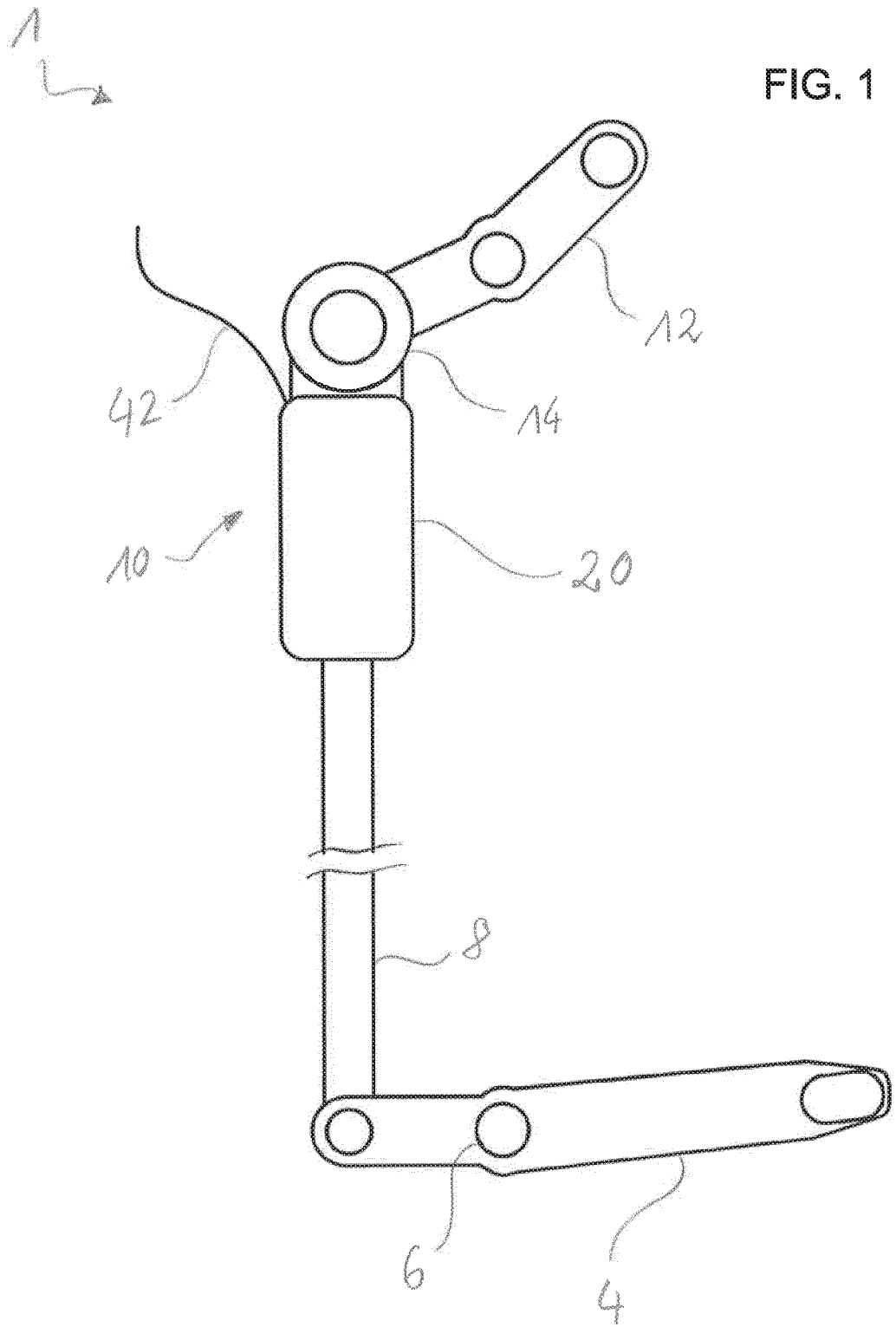
FIG. 1 is a diagrammatic, side-elevational view of a manual transmission for a motorcycle with a shift signal transmitter.

Referring now to the figures of the drawings in detail and first, particularly, to FIG. 1 thereof, there is seen a shift apparatus 1 for a manual transmission of a motorcycle. The shift apparatus 1 includes a foot lever 4, which can be movably attached to a motorcycle frame through a pivot point 6. The shift apparatus 1 also includes a thrust and pull rod 8, which is connected to the foot lever 4 in an articulated manner. The shift apparatus 1 also includes a shift signal transmitter 10, which is used to output a shift signal to an engine controller of the motorcycle. This shift signal transmitter 10 is coupled to the thrust and pull rod 8. Furthermore, the shift apparatus 1 includes a (transmission) shift lever 12, which is disposed on the power output side of the shift rod 8 and is connected thereto in an articulated manner by a connecting piece 14. The shift lever 12 is used for force transmission to a transmission control shaft of the manual transmission.

Figure 2:
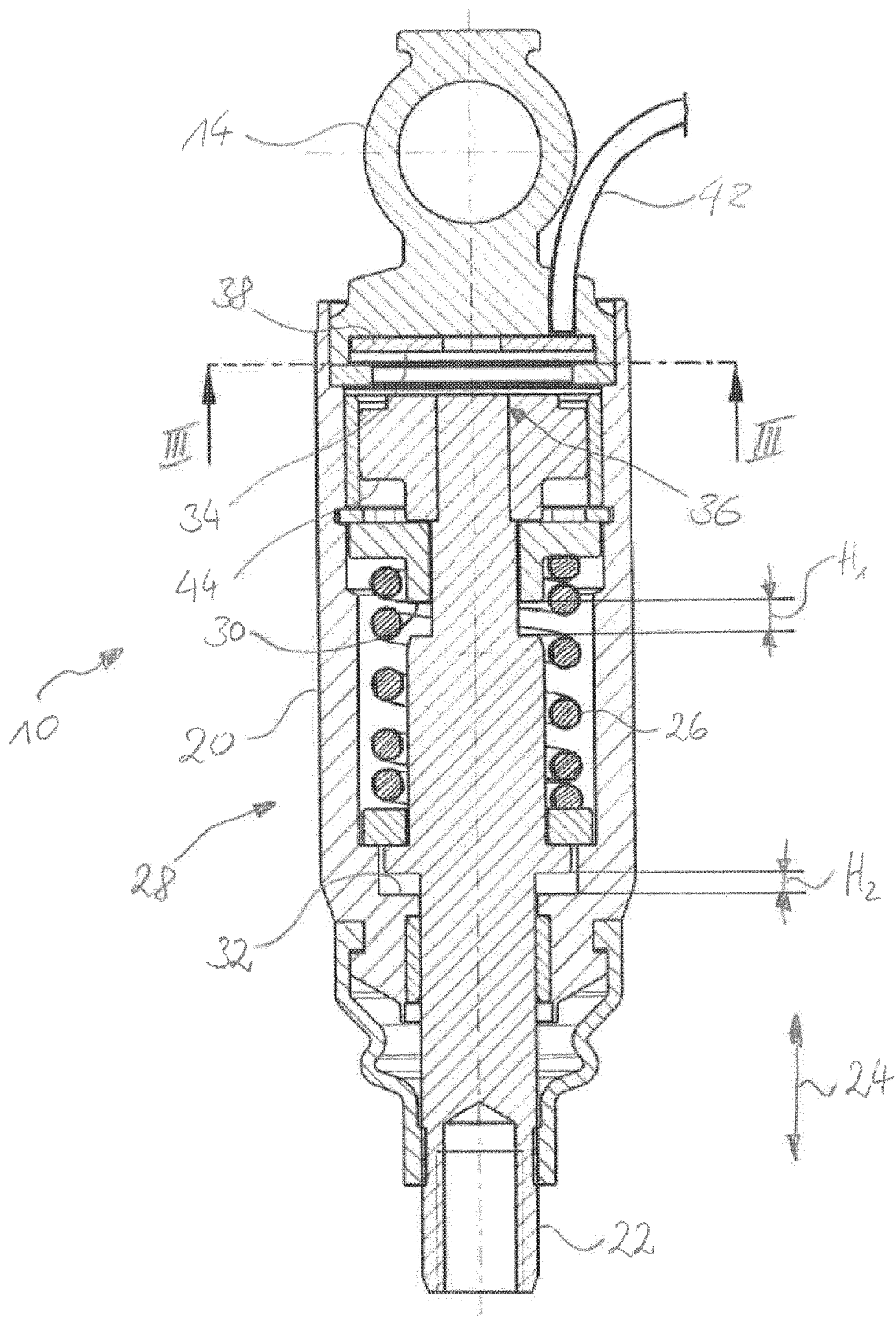
FIG. 2 is a longitudinal-sectional view of the shift signal transmitter.
Figure 3:
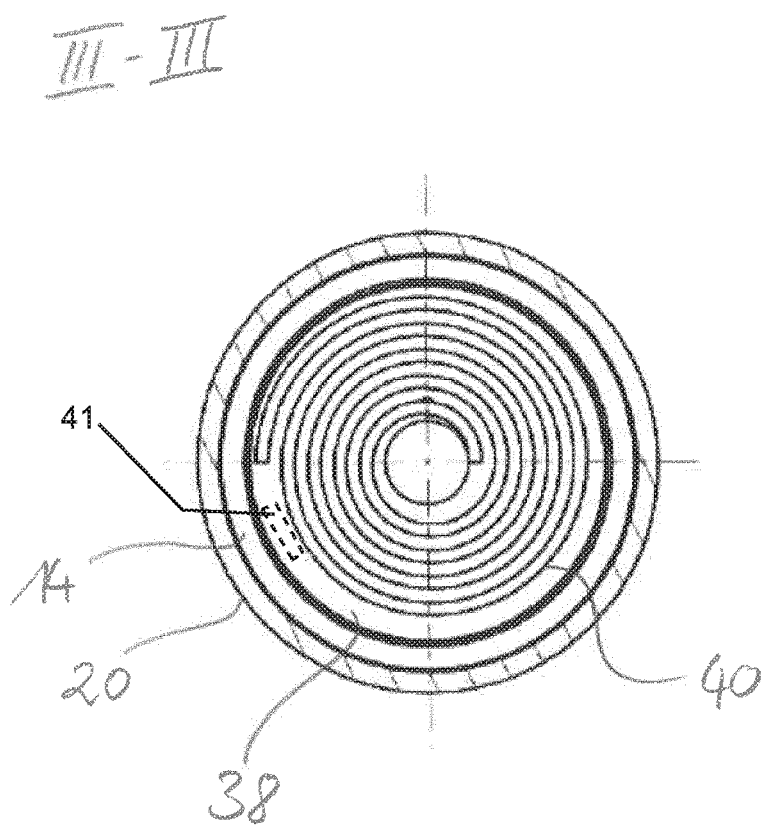
FIG. 3 is a cross-sectional view of the shift signal transmitter which is taken along a line III-III of FIG. 2 in the direction of the arrows.

FIG. 2 shows the shift signal transmitter 10 in more detail. The shift signal transmitter 10 includes a housing 20 in which a shift rod 22 that forms an extension to the thrust and pull rod 8 and that can be coupled thereto for force transfer (shown in FIG. 1 in the coupled state) can move in the axial direction 24. The thrust and pull rod 8 thus forms an extension rod for transferring force between the shift rod 22 and the foot lever 4. Moreover, the shift rod 22 is mounted by a spring, specifically a coil spring 26, so that the shift rod 22 is positioned in a neutral position 28 shown in FIG. 2 when there is no external force effect. Starting from this neutral position 28, the shift rod 22 can be moved into the housing 20 by a first shift stroke $H_1$. The axial movement into the housing 20 is limited by a first axial stop 30. The shift rod 22 can be moved from the neutral position 28 towards the foot lever 4 by a second shift stroke $H_2$ limited by a second axial stop 32. In the event of a movement beyond the respective shift stroke $H_1$ or $H_2$, the two act as drivers with the axial stops 30 and 32 and thus transmit the shift force exerted on the shift rod 22 through the housing 20 to the connecting piece 14 and thus to the shift lever 12.

In order to enable a speed alignment for simplified gear changing, the shift signal transmitter 10 includes a distance sensor 34, which is fixed in the housing 20 opposite to an internal axial end 36 of the shift rod 22. The distance sensor 34 includes a printed circuit board 38 on which a conductor track that generates an inductive measuring field is printed, specifically a preferably spiral coil 40. This coil 40 is used for inductive distance measurement between the distance sensor 34 and the internal axial end 36. The distance sensor 34 also includes an evaluation circuit 41 disposed on the printed circuit board 38, which outputs a first shift signal (preferably in the form of a voltage value) through a sensor cable 42 to the engine controller of the motorcycle when the axial end 36 approaches by the first shift stroke $H_1$ and which correspondingly outputs a second shift signal through the sensor line 42 when the axial end 36 moves away by the second shift stroke $H_2$.

The shift rod 22 carries a sleeve that is referred to as a shoe 44 at its axial end 36 for simplified support (and in particular for longitudinal guidance in the housing 20) and optionally for increasing the surface of the axial end 36 of the shift rod 22 to be sensed.

The use of the inductive distance sensor 34 has the advantage that despite the simplest possible construction of the sensor system, even when using only one sensor, a shift signal can be output at a time of a corresponding approach or distancing by the axial end 36. Furthermore, an inductive sensor principle does not require the use of comparatively expensive magnets to detect the change in the distance.

The subject-matter of the invention is not limited to the exemplary embodiment described above. Rather, further embodiments of the invention may be derived from the above description by a person skilled in the art.

REFERENCE CHARACTER LIST 1 manual transmission
4 foot lever
6 pivot point
8 thrust and pull rod
10 shift signal transmitter
12 shift lever
14 Connecting piece
20 housing
22 shift rod
24 axial direction
26 coil spring
28 neutral position
30 axial stop
32 axial stop
34 distance sensor
36 axial end
38 circuit board
40 coil
42 sensor cable
44 shoe
$H_1$ shift stroke
$H_2$ shift stroke

The invention claimed is:

1. A shift signal transmitter for a manual transmission of a vehicle or a motorcycle, the shift signal transmitter comprising:
   a housing;
   a shift rod to be connected to a foot lever for force transmission, said shift rod having an internal axial end and a longitudinal axis, said shift rod being axially movably guided along said longitudinal axis in said housing between two axial stops;
   a connecting piece to be coupled to a shift lever, said connecting piece being rigidly connected to said housing opposite to said internal axial end of said shift rod;
   a distance sensor for contactless distance measurement, said distance sensor being disposed within said housing opposite to said internal axial end of said shift rod, said distance sensor having a sensor surface oriented radially to said longitudinal axis, said distance sensor including a printed circuit board oriented within said housing opposite to said internal axial end of said shift rod, said printed circuit board having a surface extension oriented radially to said longitudinal axis of said shift rod;
   an electrically conductive conductor track carried by said circuit board for inductive distance measurement relative to said internal axial end of said shift rod; and
   an evaluation circuit carried by said circuit board.

2. The shift signal transmitter according to claim 1, wherein said electrically conductive conductor track of said circuit board is formed as a spiral coil.

3. The shift signal transmitter according to claim 1, wherein said evaluation circuit is configured to output a first shift signal when said internal axial end of said shift rod is closer to said conductor track than a first switching value, and to output a second shift signal when said internal axial end of said shift rod is further away from said conductor track than a second switching value.

4. The shift signal transmitter according to claim 3, wherein said first and second switching values are spaced apart by a shift signal-free distance.

5. The shift signal transmitter according to claim 1, wherein said printed circuit board is fixedly attached to an interior of said housing.

6. The shift signal transmitter according to claim 1, which further comprises a spring biasing said shift rod into a neutral position between said two axial stops in an unloaded state of said spring.

7. The shift signal transmitter according to claim 6, wherein said shift rod is configured to be displaced from said neutral position towards said distance sensor by a first shift stroke and to be displaced away from said distance sensor by a second shift stroke.

8. The shift signal transmitter according to claim 1, wherein said shift rod is movable in two axial directions, and upon a movement of said shift rod said two axial stops acting as a driver for transmitting a shift force in each of said axial directions.

9. The shift signal transmitter according to claim 1, wherein said shift rod is made of a non-magnetic material.

10. The shift signal transmitter according to claim 1, which further comprises a sleeve made of a non-magnetic material being mounted on said internal axial end of said shift rod for supporting said shift rod.

11. A shift apparatus for a manual transmission of a vehicle, the shift apparatus comprising a shift signal transmitter according to claim 1.

* * * * *